United States Patent
Jung et al.

(10) Patent No.: US 7,870,573 B2
(45) Date of Patent: Jan. 11, 2011

(54) OPTICAL RECORDING MEDIA AND RECORDING/REPRODUCING METHODS AND APPARATUSES FOR THE SAME

(75) Inventors: Moon-il Jung, Suwon-si (KR); Jong-chul Choi, Suwon-si (KR); Taek-seong Jeong, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1049 days.

(21) Appl. No.: 11/645,679

(22) Filed: Dec. 27, 2006

(65) Prior Publication Data

US 2007/0258343 A1 Nov. 8, 2007

(30) Foreign Application Priority Data

May 4, 2006 (KR) .................... 10-2006-0040390

(51) Int. Cl.
*G11B 7/00* (2006.01)
(52) U.S. Cl. .................................... 720/718
(58) Field of Classification Search ........................ None
See application file for complete search history.

(56) References Cited

U.S. PATENT DOCUMENTS

| | | | |
|---|---|---|---|
| 5,696,758 A | 12/1997 | Yanagimachi et al. | |
| 6,580,683 B1 * | 6/2003 | Braitberg et al. | 369/275.3 |
| 6,754,166 B2 * | 6/2004 | Arioka et al. | 369/275.1 |
| 6,787,211 B2 * | 9/2004 | Kishima | 428/64.1 |
| 7,072,255 B2 * | 7/2006 | Sasaki | 369/47.1 |
| 7,251,200 B2 * | 7/2007 | Miyatake et al. | 369/13.31 |
| 7,315,501 B1 | 1/2008 | Ramanujam et al. | |
| 7,403,457 B2 * | 7/2008 | Ogawa et al. | 369/47.53 |
| 7,423,952 B2 * | 9/2008 | Shishido et al. | 369/94 |
| 7,463,566 B2 * | 12/2008 | Park et al. | 369/53.2 |
| 7,496,027 B2 * | 2/2009 | Suzuki | 369/275.3 |
| 7,508,740 B2 * | 3/2009 | Sasaki | 369/47.1 |
| 7,573,791 B2 * | 8/2009 | Kim | 369/47.21 |
| 7,688,705 B2 * | 3/2010 | Shoji et al. | 369/275.3 |
| 2006/0077875 A1 | 4/2006 | Inoue et al. | |

FOREIGN PATENT DOCUMENTS

CN 1159046 9/1997

(Continued)

OTHER PUBLICATIONS

Search Report issued Apr. 19, 2007 but the International Searching Author for PCT International Application No. PCT/KR2007/000249.

(Continued)

*Primary Examiner*—Mark Blouin
(74) *Attorney, Agent, or Firm*—NSIP Law (57) ABSTRACT

An optical recording medium in which interference patterns formed from interference between signal light and reference light are recorded as data and a recording/reproducing method and apparatus for the optical recording medium. The optical recording medium including at least a recording layer in which predetermined data is recorded, wherein a thickness of a portion of the recording layer is larger than a thickness of another portion of the recording layer, wherein data is recorded in the thicker region, and the additional information of a recording condition and/or a reproducing condition is recorded in the thinner region.

10 Claims, 7 Drawing Sheets

FOREIGN PATENT DOCUMENTS

| | | |
|---|---|---|
| CN | 1675596 | 9/2005 |
| EP | 0 762 392 | 3/1997 |
| EP | 1 080 466 B1 | 3/2004 |
| JP | 10-21580 | 1/1998 |
| JP | 2000-268410 | 9/2000 |
| JP | 2002-092940 | 3/2002 |
| JP | 2005-321597 | 11/2005 |
| WO | WO 99/57719 | 11/1999 |

OTHER PUBLICATIONS

Chinese Office Action issued on Mar. 1, 2010, in corresponding Chinese Application No. 200780013790.5 (5 pages).

* cited by examiner

OPTICAL RECORDING MEDIA AND RECORDING/REPRODUCING METHODS AND APPARATUSES FOR THE SAME

CROSS-REFERENCE TO RELATED APPLICATION

This application claims the benefit of Korean Patent Application No. 2006-40390, filed on May 4, 2006, in the Korean Intellectual Property Office, the disclosure of which is incorporated herein by reference.

BACKGROUND OF THE INVENTION

1. Field of the Invention

An aspect of the present invention relates to optical recording media and, more particularly, to a holographic recording medium in which interference patterns, formed from interference between signal light and reference light, are recorded as data and recording/reproducing methods and apparatuses for the holographic recording medium.

2. Description of the Related Art

Recently, holographic recording media used as storage media capable of overcoming physical limitations such as optical diffraction limitations and having large storage capability have been widely researched and developed. In the holographic recording medium, interference patterns formed from interference between signal light originated from an object and reference light are recorded as data. The holographic recording medium can store hundreds or thousands of binary-data pages in the same recording position. More specifically, the interference patterns (corresponding to the data) recorded in the holographic recording medium are obtained from the signal light which is modulated into binary-data pages and the corresponding incident reference light of which position, deflecting angle, wavelength, and the like vary with multiplexing methods. In order to reproduce the data recorded in the holographic recording media, reproducing-reference light having the same condition as that of the recording-reference light is incident on the holographic recording media. When the reproducing-reference light is incident, the recorded interference pattern diffracts the reproducing-reference light, so that the interference pattern can be demodulated into one binary-data page having original bright and dark pixel patterns.

Recording materials used for the holographic recording media include photopolymer and photo refractive crystal, and so on. Since the photopolymer is inexpensive and has high diffraction efficiency, the photopolymer has been widely used as a recording material for the holographic recording media. When photopolymer reacts with light, monomers thereof are polymerized, so that the refractive index changes. The photopolymer is constructed with the monomers, a polymeric binder, a sensitizing dye, and an initiator. The wavelength of light is selected by the sensitizing dye. The polymers are non-uniformly distributed in space according to the intensity of light, forming a high polymer density region and a low polymer density region. The non-uniform distribution of the polymer causes a non-uniform distribution in the refractive index. On the other hand, after desired interference patterns are projected on the holographic recording medium, the interference patterns are exposed to UV light to be cured so as for the reaction not to proceed. The process is called UV curing.

The refractive index and volume of the photopolymer changes with temperature at the time of the UV curing and the data recording. In turn, the changes in refractive index and volume cause a change in pitches between the recorded interference patterns, so that signals reproduced from the holographic recording medium may be degraded. Therefore, techniques for suppressing or compensating for the changes in refractive index and volume at the time of reproduction of the holographic recording medium have been widely researched.

An example of compensating for the changes in refractive index and volume according to the temperature includes a method of compensating for contraction of a recording layer at the time of reproduction by illuminating heat generating layers with a separate light source having a wavelength different from that of a recording light source disclosed in Japanese Patent Application No. 2004-139479. More specifically, the heat generating layers are disposed on both sides of the holographic recording layer. When the holographic recording layer is contracted, the heat generating layers are illuminated with heating laser having a wavelength different from those of recording and reproducing lasers so as to increase the temperature of the holographic recording layer. As a result, it is possible to compensate for the changes in refractive index and volume caused from the contraction and deformation of the holographic recording medium.

However, holographic recording media in the related art have problems in that production processes and costs increase due to the additional heat generating layers. In addition, there are some problems caused from a difference in physical characteristics at interfaces between the heat generating layers and the photopolymer. In addition, since an additional light source for illuminating the heat generating layers needs to be provided to a recording/reproducing apparatus for the holographic recording medium, there is a problem in the construction of the recording/reproducing apparatus becomes more complicated and power consumption increases.

SUMMARY OF THE INVENTION

An aspect of the present invention provides a holographic recording medium in which regions having different thicknesses are formed in a holographic recording layer, wherein interference patterns formed from interference between signal light and reference light are recorded as data in a thicker region, and wherein information on a data recording condition is recorded in a thinner region which has a higher selectivity.

Another aspect of the present invention provides a recording method and apparatus for a holographic recording medium, wherein a data recording condition is recorded in a thinner region of a holographic recording layer of the holographic recording medium when the data is recorded in the holographic recording medium.

Another aspect of the present invention provides a reproducing method and apparatus for a holographic recording medium, in which information on a data recording condition is read when data recorded in a data region of the holographic recording medium is reproduced and a suitably-compensated incident angle and wavelength of reference light is calculated so as to prevent degradation of a reproducing signal.

According to an aspect of the present invention, there is provided an optical recording medium including at least a recording layer in which predetermined data is recorded, wherein a thickness of a region of the recording layer is smaller than the thickness of another region of the recording layer.

According to another aspect of the present invention, there is provided a recording and/or reproducing method for an optical recording medium, including: recording and/or reproducing a recording condition in a first data region of the optical recoding medium; and recording and/or reproducing a user data in a second data region of the optical recording medium; wherein a thickness of the first data region is different from a thickness of a second data region.

According to another aspect of the present invention, there is provided a recording and/or reproducing apparatus for an optical recording medium, including a pick-up unit which records and/or reproduces a recording condition in a first data region of the optical recording medium and records and/or reproduces a user data in a second data region of the optical recording medium; wherein a thickness of the first data region is different from a thickness of the second data region.

According to another aspect of the present invention, there is provided a reproducing method for an optical recording medium, including: determining a data recording condition by illuminating a disc information storage region in which the recording condition is recorded with reference light; determining a reproducing condition for reproduction of the data recorded in the data region based on the determined recording condition; and detecting reproducing light generated by illuminating the data region with reference light according to the determined reproducing condition and reproducing the data.

According to another aspect of the present invention, there is provided a reproducing apparatus for an optical recording medium, including: a reading unit which reproduces data recorded in a data region by illuminating the data region with reference light and reproduces a data recording condition by illuminating a disc information storage region in which the recording condition is recorded and has a thickness smaller than that of the data region with the reference light; and a controller which determines a reproducing condition for reproduction of the data recorded in the data region based on the recording condition and controls the reference light to be illuminated on the data region according to the determined reproducing condition.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In a holographic recording medium according to an embodiment of the present invention, a holographic recording layer in which interference patterns formed from interference between signal light and reference light are recorded as data includes a data region in which the data recorded and a disc information storage region in which a data recording condition is recorded, and a thickness of the disc information storage region is smaller than that of the data region. The interference pattern formed from the interference between the signal light and the reference light is referred to as a hologram. The recording condition includes information on a temperature of the holographic recording medium and information on addresses corresponding to recording positions thereof. The recording condition may additionally include characteristic parameters of the holographic recording medium such as M number, selectivity, and thickness of the holographic recording layer.

In an aspect of the present invention, since a thinner holographic recording layer has a higher selectivity, the disc information storage region is designed to be thinner than the data region. The selectivity denotes a degree of recovery of a hologram recorded in the holographic recording layer without interference from other holograms. As a well-known selectivity, a Bragg angular selectivity $\Delta\theta$ represented by Equation 1 is used.

$$\Delta\theta = \frac{\lambda\cos\theta_s}{L\sin(\theta_f + \theta_s)} \qquad \text{[Equation 1]}$$

In Equation 1, L is a thickness of the holographic recording layer, $\lambda$ is a wavelength of light, $\theta_f$ is an angle of the reference light, and $\theta_s$ is an angle of the signal light. It can be understood from Equation 1 that, when the holograms are multiplexed and recorded according to a changing angle between the reference light and the signal light, the angular selectivity $\Delta\theta$ is inversely proportional to the thickness L of the holographic recording layer. Therefore, a selectivity of a thinner holographic recording layer is preferable over that of a thicker holographic recording layer.

In the holographic recording medium according to the embodiment of the present invention, the data recording condition is recorded in the thinner holographic recording layer, so that degradation of a reproduction signal caused from a change in temperature of the holographic recording medium at the time of reproduction of the data can be compensated based on the recording condition. In addition, since the thinner holographic recording layer has smaller changes in refractive index and volume according to the temperature than the thicker holographic recording layer has, a more stabilized signal can be detected. Although the following description is mainly based on the holographic recording medium, the aspects of the present invention can be applied to other optical recording media.

Figure 1:
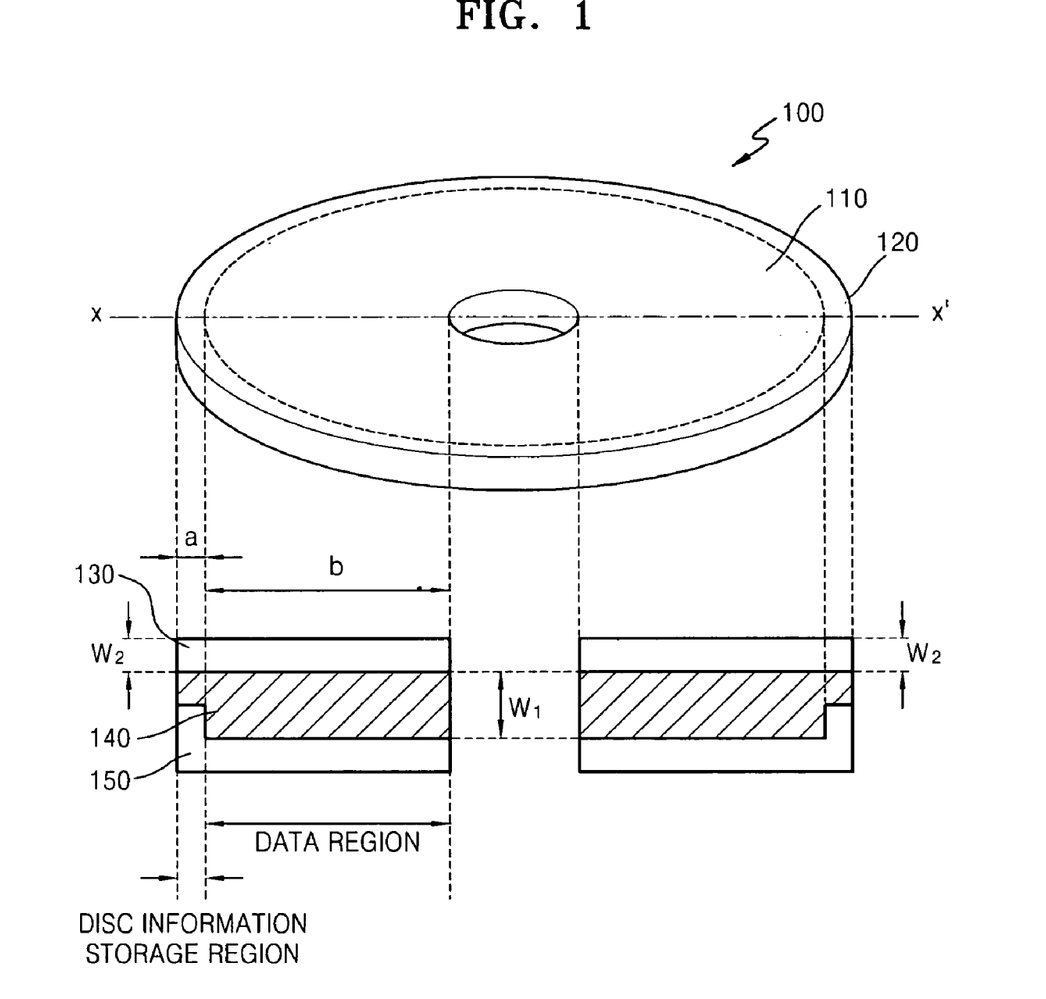
FIG. 1 shows a perspective view and a cross-sectional view of a holographic recording medium according to an embodiment of the present invention.

FIG. 1 shows a perspective view and a cross-sectional view of the holographic recording medium according to the embodiment of the present invention. In FIG. 1, a lower view shows a cross section taken along X-X' of an upper view of the holographic recording medium 100.

The holographic recording medium 100 according to the embodiment of the present invention includes a first substrate 130, a holographic recording layer 140, and a second substrate 150. The holographic recording medium 100 has a shape of a disc. In the holographic recording layer 140, a region having a radial length "b" extending from an inner circumference to an outer circumference is allocated to a data region 110 in which the data are recorded, and a region having a radial length "a" extending inwardly from the outer circumference is allocated to a disc information storage region 120 in which the data recording condition is recorded. A thickness W1 of the data region 110 is designed to be larger than a thickness W2 of the disc information storage region 120.

As described above, the information on the temperature of the holographic recording medium 100 when the data is recorded in the data region 110 and the information on the addresses corresponding to the recording positions is recorded in the disc information storage region 120. In addition, as additional information, the characteristic parameters of the holographic recording medium 100 such as M number, selectivity, and thickness information may be recorded in the disc information storage region 120. At the time of reproduction, the recording condition is reproduced prior to the data recorded in the data region 110, and then, used to determine a reproducing condition for reproduction of the data.

Figure 2:
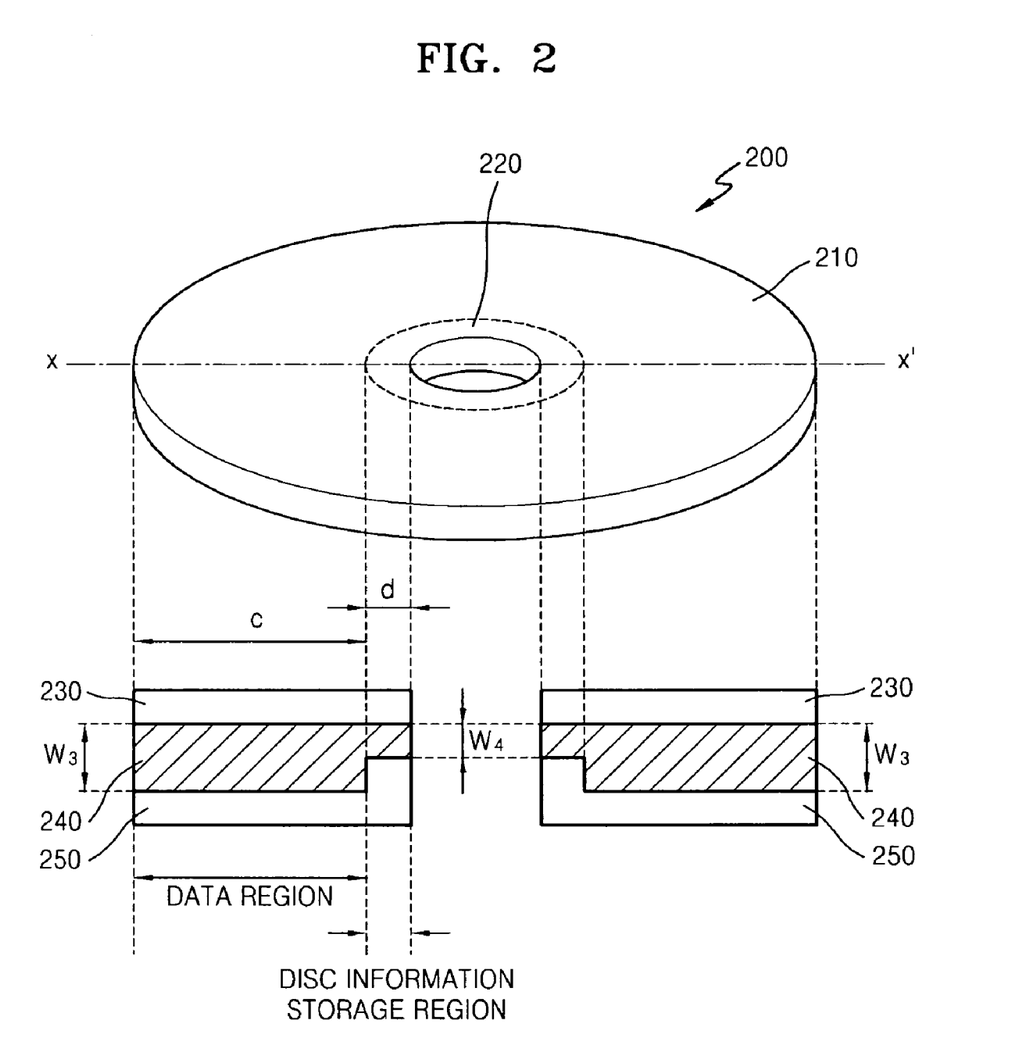
FIG. 2 shows a perspective view and a cross-sectional view of a holographic recording medium according to another embodiment of the present invention.

FIG. 2 shows a perspective view and a cross-sectional view of a holographic recording medium according to another embodiment of the present invention. In FIG. 2, a lower view shows a cross section taken along line X-X' of an upper view of the holographic recording medium 200.

The holographic recording medium 200 according to the embodiment of the present invention includes a first substrate 230, a holographic recording layer 240, and a second substrate 250. Similar to the holographic recording medium 100 according to the aforementioned embodiment, the holographic recording medium 200 has a shape of a disc. Unlike the holographic recording medium 100, the disc storage information region 220 is disposed in an inner circumferential portion of the holographic recording layer 240. More specifically, in the holographic recording layer 240, a region having a radial length "d" extending from an inner circumference to an outer circumference is allocated to the disc information storage region 220, and a region having a radial length "c" extending inwardly from the outer circumference of the disc is allocated to a data region 210 in which the data is recorded. A thickness W3 of the data region 210 is designed to be larger than a thickness W4 of the disc information storage region 220.

Figure 3:
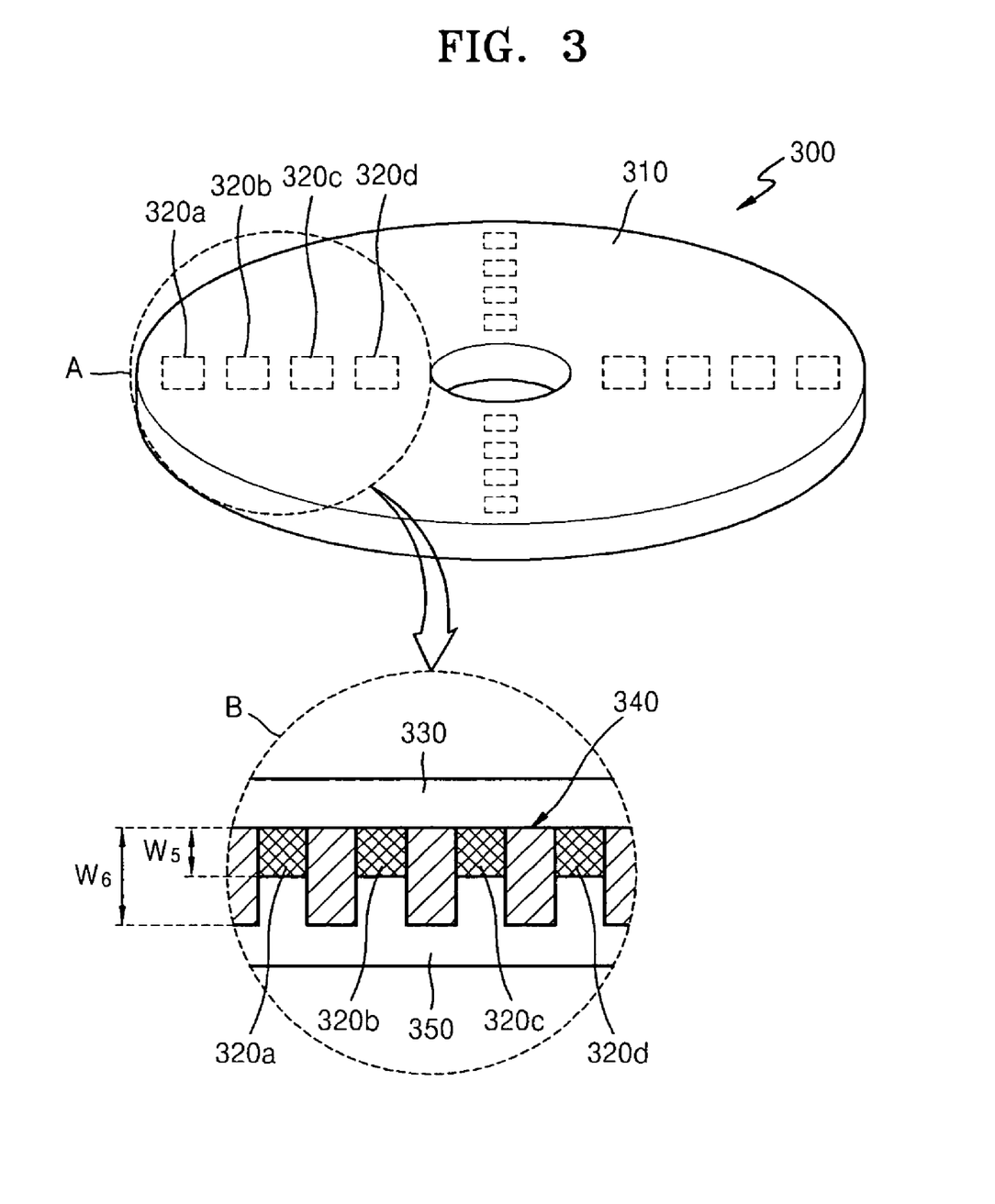
FIG. 3 shows a perspective view and a partial enlarged view of a holographic recording medium according to another embodiment of the present invention.

FIG. 3 shows a perspective view and a partial enlarged cross-sectional view of a holographic recording medium 300 according to another embodiment of the present invention. In FIG. 2, a lower view shows a partial enlarged cross section taken along line X-X' of a portion A of an upper view of the holographic recording medium 300.

The holographic recording medium 300 according to the embodiment of the present invention includes a first substrate 330, a holographic recording layer 340, and a second substrate 350. Unlike the aforementioned embodiments where the disc information storage region is disposed in the inner or outer circumferential portion of the holographic recording layer, in the holographic recording layer 340 according to the embodiment, disc information storage regions 320a, 320b, 320c, 320d, . . . are formed in a shape of spots in one or more localized regions in a data region 310. Similar to the aforementioned embodiments, a thickness W6 of the data region 310 is designed to be larger than a thickness W5 of each of the disc information storage regions 320a, 320b, 320c, 320d, . . . .

Figure 4A:
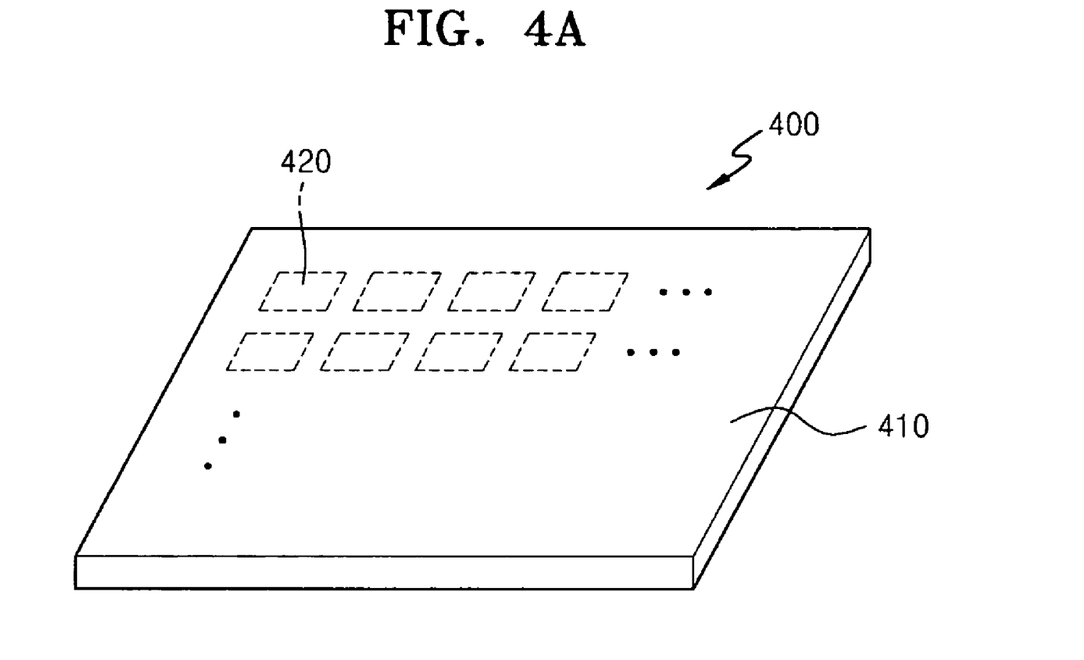
FIGS. 4A and 4B are views showing holographic recording media according to another embodiment of the present invention.
Figure 4B:
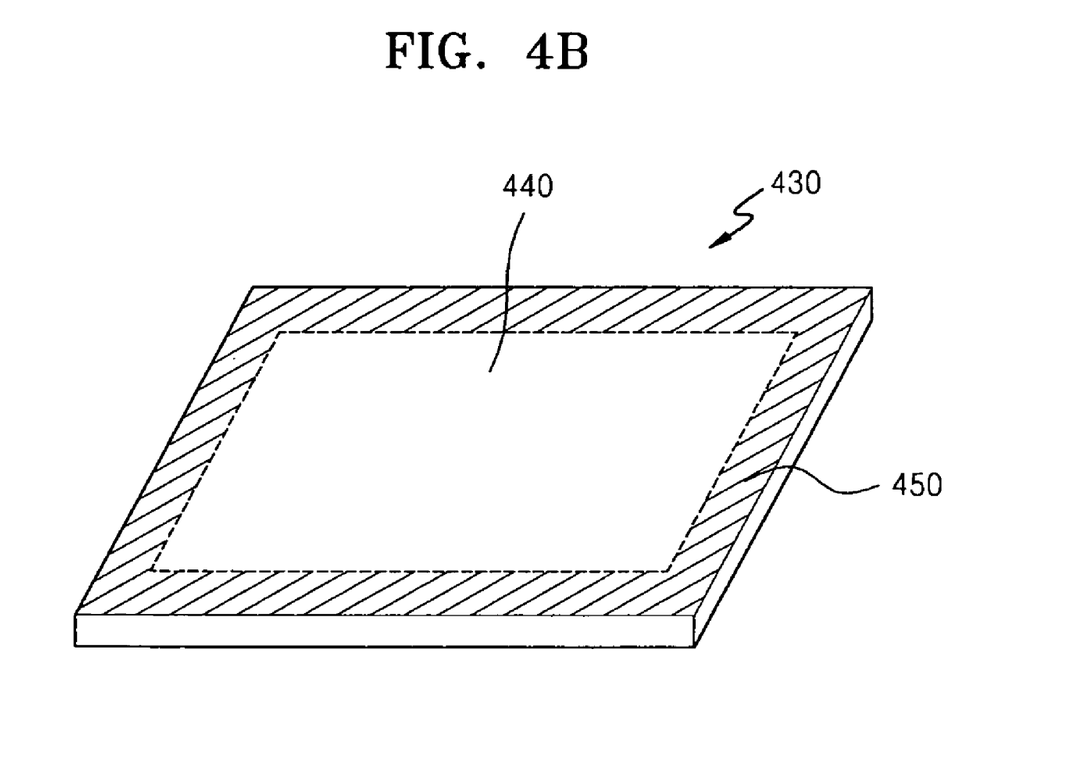

FIGS. 4A and 4B are views showing holographic recording media according to another embodiment of the present invention.

A holographic recording medium 400 shown in FIG. 4A has a construction similar to that of the holographic recording medium 300 shown in FIG. 3 except that the holographic recording medium 400 is formed in a shape of a card. Therefore, information storage regions 420 are formed in a shape of a spot in one or more localized regions in a holographic recording layer, and a thickness of each of the information storage regions 420 is designed to be smaller than that of a data region 410.

A holographic recording medium 430 shown in FIG. 4B has a construction similar to that of the holographic recording medium 100 shown in FIG. 1 except that the holographic recording medium 400 is formed in a shape of a card. Therefore, information storage region 450 is disposed in a peripheral portion of a holographic recording layer, and a thickness of the information storage region 450 is designed to be smaller than that of a data region 440.

Although the above description is only drawn to the disc-type or card-type holographic recording media, it is obvious that the aspects of the present invention can be applied to other types of holographic recording media having different shapes.

Now, recording/reproducing methods and apparatuses for the holographic recording medium according to the aspects of the present invention are described.

Figure 5:
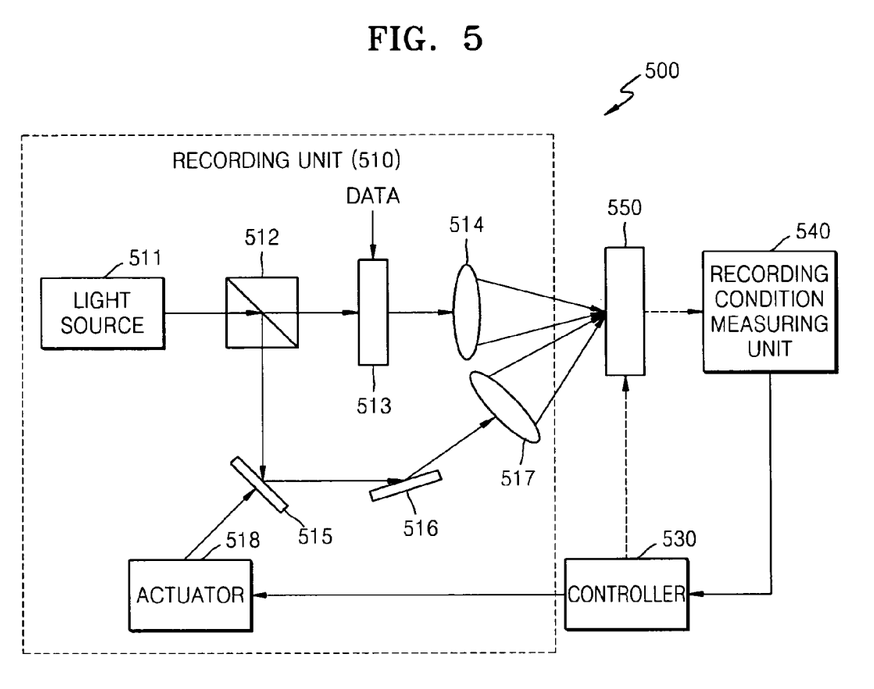
FIG. 5 is a schematic block diagram showing a recording apparatus for a holographic recording medium according to another embodiment of the present invention.

FIG. 5 is a schematic block diagram showing a recording apparatus for a holographic recording medium according to another embodiment of the present invention.

Referring to FIG. 5, the recording apparatus 500 according to an embodiment of the present invention includes a recording unit 510 which records data in a data region of a holographic recording medium 550 by illuminating the data region with signal light and reference light and records a data recording condition in a disc information storage region by illuminating the disc information storage region with the signal light and the reference light, a recording condition measuring unit 540 which measures the data recording condition, and a controller 530 which controls the recording unit 510.

More specifically, the recording unit 510 includes a light source 511, a beam splitter 512, a spatial light modulator (SLM) 513, a first lens 514, a mirror 515, a reflecting mirror 516, a second lens 517, and an actuator 518.

The beam splitter 512 splits a laser incident from the light source 511 into signal light and reference light.

The reference light which is a rectangular polarized light incident on the mirror 515 is adjusted by an optical lens (not shown), so that the beam size thereof is enlarged. Sequentially, the reference light is deflected at a predetermined angle by the reflecting mirror 516 and incident on the holographic recording medium 550.

The signal light split by the beam splitter 512 is transmitted to the SLM 513. The SLM 513 modulates the signal light into binary-data pages having bright and dark pixel patterns according to the to-be-recorded data which is externally input. The modulated signal light is incident on the holographic recording medium 550 in synchronization with the reference light.

Interference patterns formed from interference between the signal light and the reference light corresponding to the input data are recorded in the data region of the holographic recording layer of the holographic recording medium 550.

The recording condition measuring unit 540 measures the data recording condition of the holographic recording layer. As described above, the recording condition includes information on addresses corresponding to the recording positions and information on the temperature of the holographic recording medium when the data is recorded in the data region.

The controller 530 controls the recording unit 510 to record the interference patterns corresponding to the input data in the data region of the holographic recording medium 550. In addition, the controller 530 controls the recording unit 510 to record the recording condition such as information on the temperature measured by the recording condition measuring unit 540 in the disc information storage region of the holographic recording medium 550. A process for recording the recording condition, such as information of the temperature, in the disc information storage region is the same as the process of recording the data in the data region, except that the recording object is the disc information storage region. As described above, as additional information, the characteristic parameters of the holographic recording medium 550 such as M number, selectivity, and thickness information may be recorded in the disc information storage region.

Figure 6:
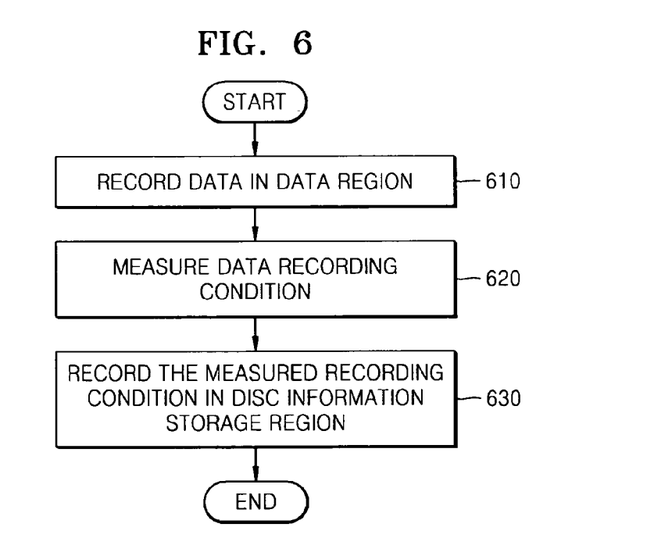
FIG. 6 is a flowchart showing a recording method for a holographic recording medium according to another embodiment of the present invention.

FIG. 6 is a flowchart showing a recording method for a holographic recording medium according to another embodiment of the present invention.

Referring to FIG. 6, data is recorded in a data region of a holographic recording layer by illuminating the data region with signal light and reference light (operation 610). Next, a data recording condition such as a temperature of the holographic recording medium is measured (operation 620). Next, the measured recording condition is recorded in a disc information storage region of the holographic recording layer by illuminating the disc information storage region with the signal light and the reference light (operation 630).

Figure 7:
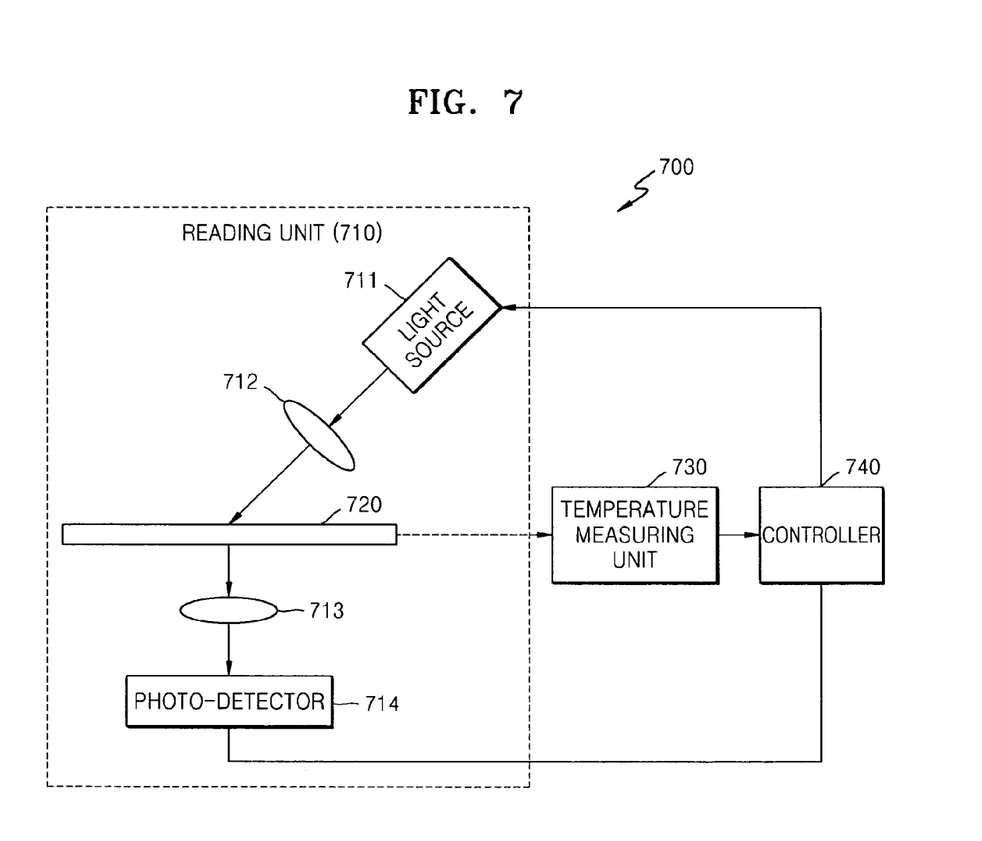
FIG. 7 is a schematic block diagram showing a reproducing apparatus for a holographic recording medium according to another embodiment of the present invention.

FIG. 7 is a schematic block diagram showing a reproducing apparatus for a holographic recording medium according to another embodiment of the present invention.

Referring to FIG. 7, the reproducing apparatus 700 includes a reading unit 710 which reproduces date recorded in a data region of a holographic recording medium 720 by illuminating the data region with reference light and reproduces a recording condition recorded in a disc information storage region by illuminating the disc information storage region with the reference light, a temperature measuring unit 730 which measures a temperature of the holographic recording medium 720 at the time of reproduction, and a controller 740 which determines a reproducing condition for reproduction of the data recorded in the data region based on the recording condition read by the reading unit 710 and controls the reference light to be illuminated on the data region according to the determined reproducing condition.

More specifically, the reading unit 710 includes a light source 711, a first lens 712, a second lens 713, and a photo-detector 714. The reference light emitted from the light source 711 passes through the first lens 712 and is incident on the holographic recording medium 720. Under the control of the controller 740, an incident angle and wavelength of the reference light emitted from the light source 711 are adjusted so that degradation of a reproducing signal caused from changes in refractive index and volume of the holographic recording medium 720 can be compensated. When the reference light is incident on the holographic recording medium 720, two-dimensional signal patterns containing original information are generated and detected by the photo-detector 714 such as a charge coupled device (CCD).

Particularly, in order to determine the changes in refractive index and volume between the recording time and the reproduction time of the holographic recording medium 720, the controller 730 controls the reading unit 710 to read the recording condition recorded in the disc information storage region prior to reading the data. As described above, the recording condition includes information of the temperature of the holographic recording medium 720 when the predetermined data is recorded in the data region and information of the addresses corresponding to the recording positions of the holographic recording medium 720.

The temperature measuring unit 730 measures the current temperature of the holographic recording medium 720 and outputs the result of the measurement to the controller 740. The controller 740 calculates a temperature difference between the current temperature of the holographic recording medium 720 and the temperature of the holographic recording medium 720 when the predetermined data is recorded in the data region based on the read recording condition. The controller 740 calculates the changes in refractive index and volume of the holographic recording medium 720 according to the calculated temperature difference. Generally, there is a linear relationship between a change in refractive index or volume of a recording medium such as a holographic recording medium and a change in temperature thereof. Therefore, if the change in temperature is known, the changes in refractive index and volume of the medium, that is, directional change in length of the holographic recording medium can be calculated.

The controller 740 controls the reading unit 710 to compensate for the incident angle and wavelength of the reference light based on the calculated changes in refractive index and volume so that the reproducing signal of the data recorded in the data region can be normally detected without degradation of the reproducing signal.

Figure 8:
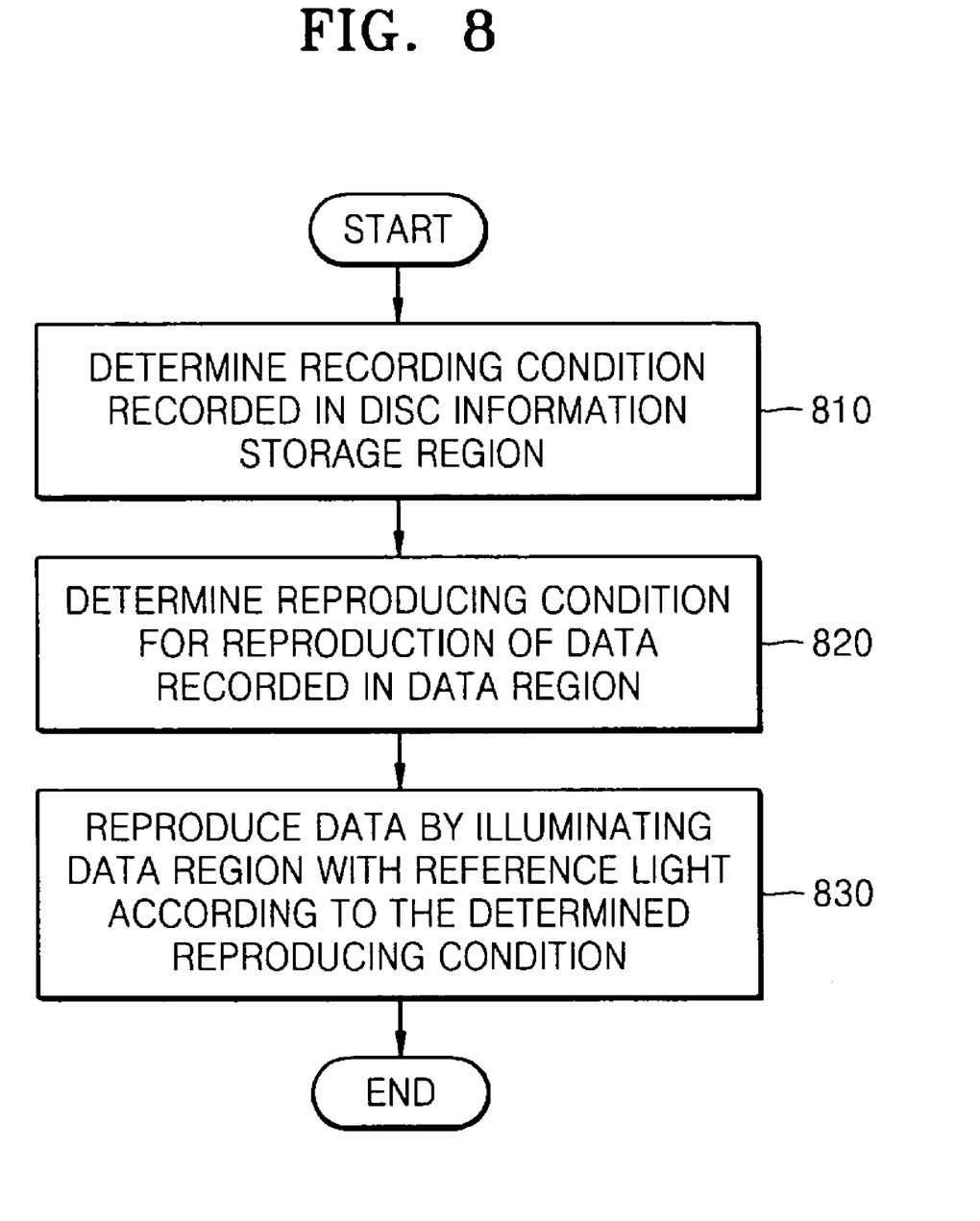
FIG. 8 is a flowchart showing a recording method a holographic recording medium according to another embodiment of the present invention.

FIG. 8 is a flowchart showing a recording method of a holographic recording medium according to another embodiment of the present invention.

Referring to FIG. 8, a data recording condition, that is, a recording condition when data is recorded in a data region is determined by illuminating a disc information storage region of a holographic recording medium with reference light (operation 810). Next, a reproducing condition for reproducing the data recorded in the data region is determined based on the determined recording condition (operation 820). The reproducing condition includes an incident angle and wavelength of the reference light which are used to compensate for changes in refractive index and volume of the holographic recording medium. As described above, the reproducing condition can be determined by calculating a temperature difference between the current temperature of the holographic recording medium and the temperature of the holographic recording medium when a predetermined data was recorded in the data region (determined in operation 810), calculating changes in refractive index and volume of the holographic recording medium according to the calculated temperature difference, and adjusting an incident angle and wavelength of the reference light based on the calculated changes in refractive index and volume.

When the reproducing condition is determined, the reproducing light is generated and the data region is illuminated with the reference light, thereby reproducing the data (operation 830).

According to another aspect of the present invention, it is possible to compensate for degradation in a reproducing signal caused from a temperature difference between a current temperature of a holographic recording medium and a temperature when the data is recorded in the holographic recording medium and to improve quality of the reproducing signal. In addition, according to another aspect of the present invention, it is possible to stably provide basic information on the holographic recording medium and information on recording positions thereof. In addition, it is possible to simplify a construction of a holographic recording medium and production processes thereof. In addition, it is possible to miniaturize an optical system for recording and reproduction of the holographic recording medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical recording medium comprising:
   at least one recording layer in which data is recorded, a thickness of a region of the recording layer being less than a thickness of another region of the recording layer,
   wherein data is recorded in a data region, and
   wherein additional information of the optical recording medium is recorded in a disc information storage region having a thickness less than a thickness of the data region.

2. The optical recording medium of claim 1, wherein interference patterns formed from interference between signal light and reference light are recorded as data in the recording layer.

3. The optical recording medium of claim 1, wherein the additional information comprises a recording condition and/or a reproducing condition of the recording layer.

4. The optical recording medium of claim 1, wherein:
   the optical recording medium has a shape of a disc; and
   the disc information storage region is formed in an outer circumferential portion of the optical recording medium.

5. The optical recording medium of claim 1, wherein:
   the optical recording medium has a shape of a disc; and
   the disc information storage region is formed in an inner circumferential portion of the optical recording medium.

6. The optical recording medium of claim 1, wherein the disc information storage region is formed in a shape of a spot in one or more localized regions of the data region.

7. The optical recording medium of claim 1, wherein the additional information comprises characteristic information of the optical recording medium comprising M number, selectivity, and thickness of the optical recording medium.

8. The optical recording medium of claim 1, wherein the additional information comprises information of addresses corresponding to recording positions in the optical recording medium.

9. The optical recording medium of claim 1, wherein the additional information comprises information of a temperature of the optical recording medium when the data is recorded in the data region.

10. The optical recording medium of claim 1, wherein interference patterns formed from interference between signal light and reference light are recorded as data in the recording layer.

* * * * *